United States Patent
Rose

(10) Patent No.: US 11,753,237 B2
(45) Date of Patent: Sep. 12, 2023

(54) OIL TANK SEALING DEVICE WITH OPTIONAL CABLE GREASER AND RELATED METHODS

(71) Applicant: Dennis Rose, Midland, TX (US)

(72) Inventor: Dennis Rose, Midland, TX (US)

(*) Notice: Subject to any disclaimer, the term of this patent is extended or adjusted under 35 U.S.C. 154(b) by 1023 days.

(21) Appl. No.: 16/580,994

(22) Filed: Sep. 24, 2019

(65) Prior Publication Data

US 2021/0086988 A1    Mar. 25, 2021

(51) Int. Cl.
*B65D 90/08* (2006.01)
*D07B 7/12* (2006.01)
*B65D 88/06* (2006.01)

(52) U.S. Cl.
CPC .............. *B65D 90/08* (2013.01); *B65D 88/06* (2013.01); *D07B 7/12* (2013.01); *F16N 2210/34* (2013.01)

(58) Field of Classification Search
CPC .......... B65D 90/08; B65D 88/06; D07B 7/12; F16N 2210/34; F16N 29/02
USPC ....................................................... 184/15.1
See application file for complete search history.

(56) References Cited

U.S. PATENT DOCUMENTS

| | | | | |
|---|---|---|---|---|
| 1,589,108 A | * | 6/1926 | Ettore | F16C 1/24 74/502.6 |
| 2,435,120 A | | 1/1945 | Baker | |
| 2,654,442 A | | 10/1953 | Yakopatz | |
| 3,828,890 A | * | 8/1974 | Schott | D07B 7/12 184/105.1 |
| 4,063,617 A | * | 12/1977 | Shenk | H01B 13/228 184/15.1 |
| 4,069,894 A | * | 1/1978 | Black | F16N 7/12 184/15.1 |
| 4,422,529 A | * | 12/1983 | Johansen | B66D 1/28 184/15.1 |
| 4,749,059 A | * | 6/1988 | Jonnes | F16N 7/12 118/DIG. 18 |
| 5,632,356 A | * | 5/1997 | Sells | H02G 1/08 184/15.1 |
| 6,145,624 A | * | 11/2000 | Tharpe | F16N 11/00 184/105.3 |

FOREIGN PATENT DOCUMENTS

KR    20120001371 U    8/2010

* cited by examiner

*Primary Examiner* — Michael R Mansen
*Assistant Examiner* — Mark K Buse
(74) *Attorney, Agent, or Firm* — William Gray Mitchell

(57) ABSTRACT

The invention is a device for sealing a hole or valve in a petroleum tank to prevent emissions, while optionally also automatically greasing a cable in a measured amount to combat friction and a method of use of such device, along with methods of manufacture and use.

13 Claims, 3 Drawing Sheets

OIL TANK SEALING DEVICE WITH OPTIONAL CABLE GREASER AND RELATED METHODS

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a device for sealing a hole in an oil tank to prevent emissions and optionally for automatically greasing a cable to prevent friction between the cable and other surfaces.

Background of the Invention

The use of oil storage tanks sometimes requires the use of one or more access holes through which devices may be inserted from outside to inside the tank. For example, such access holes may carry hoses for the addition or removal of fluid, or cables for use in measurement devices. Whenever such a hole is required, there exists the problem of unwanted fluid emissions, whether gas or liquid, spilling from the hole.

Standard technology will often call for the use of hard pipe or flexible tube inserts, often in combination with rubber or flexible plastic seals such as o-rings, in an attempt to contain potential fluid emissions or leaks. Such mechanisms may operate effectively for a limited time, but tend to involve materials that wear relatively quickly and can fail without warning due to cracking, tearing or similar issues.

In any device requiring sustained movement of a rope or cable across or through one or more hardened surfaces, there exists the problem of friction acting on such rope or cable, and gradually fraying the line and slowing the progress of such movement.

In particular, the use of cables in various designs of oil and other fluid storage tanks is known, as such cables are helpful for the employment of various measurement and similar devices inside the tank. Such devices can be used to measure levels, compositions, temperatures and other conditions of the fluid within the tanks. Often, such devices rely on attached cables to allow for such devices' insertion, removal and repositioning within the tank. Such cables must necessarily come into contact with the tank wall and/or liner at the point(s) where the cable moves from outside the tank to inside the tank, and the sliding of the cable past or through such points of contact carries the risk of impairing the cable motion and damage to the cable itself due to friction between the cable and the wall or liner.

Various cable greasing devices have been known over time. For example, U.S. Pat. No. 2,654,442 to Yakopatz discloses a wire rope greaser made of metal and comprising grooved wheels, grease-filled antechambers and a plurality of squeegee blades to remove excess grease. In another example, KR 20100001371U, discloses an apparatus for spreading grease on a cable where again we see a metallic grease box combined with rollers and a valve to allow grease to be applied from the box to a cable as the latter rolls past. In each of these designs, we see multiple interrelated moving parts fixed together and requiring a consistent level of maintenance and a likelihood of breakdown.

Consistent design failures in known cable or rope greasing devices include the application of friction and heat to the rope or cable, the likelihood of electrical conduction between the cable and device parts, or between the device parts themselves, and the introduction and presence of unwanted air within the grease receptacle of such devices.

As such, the objective of the present invention is to further provide a tank sealing with an optional cable greasing device to avoid the disadvantages known from prior art.

BRIEF SUMMARY OF THE INVENTION

In a preferred embodiment, an adjustable oil tank seal device, comprising a pipe tee comprising three threaded holes including a top hole, a bottom hole and side hole, such pipe tee filled with solid epoxy comprising a first channel drilled between the centers of the top and bottom holes and a second channel drilled from the center of the side hole to the first channel, further comprising a cable running through the first channel, an o-ring overlaying the epoxy at each of the three holes, pipe nipples screwed into each side hole, and a refillable greaser component screwed into the side hole, such greaser component comprising a cylinder with a hollow grease reservoir, a spring-loaded plunger seated inside the reservoir, a funnel base located between the reservoir and the tee and a connector between the funnel base and the tee, wherein one pipe nipple is attached to a corresponding oil tank hole.

In another preferred embodiment, the oil tank seal device as described herein, wherein the pipe tee, pipe nipples, connector and funnel base are all attached via screw threads.

In another preferred embodiment, the oil tank seal device as described herein, wherein all hardened components are made of stainless steel, brass, titanium, another metal of low conductivity or a nonconductive plastic.

In another preferred embodiment, the oil tank seal device as described herein, wherein the cylinder is comprised of either metal, hard plastic or a combination thereof.

In another preferred embodiment, the oil tank seal device as described herein, wherein the cylinder screws onto the funnel base.

In another preferred embodiment, the oil tank seal device as described herein, further comprising a plunger handle to manually pull the plunger towards the spring during reservoir refill.

In another preferred embodiment, the oil tank seal device as described herein, further comprising a fill hole with a plug in the area of the cylinder near to the funnel base for refilling.

In another preferred embodiment, the oil tank seal device as described herein, further comprising wherein an o-ring is located within each joint of the device.

In another preferred embodiment, the oil tank seal device as described herein, wherein each o-ring is made from one or more of the group consisting of rubber, synthetic rubber, neoprene or a similar known substance.

In another preferred embodiment, the oil tank seal device as described herein, wherein the hardened plastic block is manufactured by filling the metal cylinder with a two-part nonconductive epoxy composition.

In another preferred embodiment, the oil tank seal device as described herein, further comprising a grease line connecting the side hole of the pipe tee to the greaser component connector.

In another preferred embodiment, a method of manufacturing the adjustable oil tank seal device of claim 1, comprising the following steps: screw a pipe plug into each of two holes of the pipe tee, fill the pipe tee with two-part epoxy through an open hole and allow to dry; remove the pipe plugs; drill the first channel between the top and bottom holes and the second channel from the side hole; place o-rings over each end of the first channel and secure by attaching a pipe nipple to each of the top hole and bottom hole; attach an assembled greaser component to the side hole; and extend a cable through the first channel and pipe nipples.

In another preferred embodiment, a method of use of the adjustable oil tank seal device of claim 1, comprising the following steps: attach the pipe nipple covering the bottom hole of the pipe tee to a corresponding oil tank hole by screwing, clamping or a similar means of attachment; extending a cable into the top hole through the first channel and out through the bottom hole and accompanying pipe nipple; attaching the protruding end of the cable to an attachment for use inside the oil tank; extending the attachment and cable through the oil tank hole and into the oil tank; and filling the greaser component with grease.

DETAILED DESCRIPTION OF THE INVENTION

Figure 1:
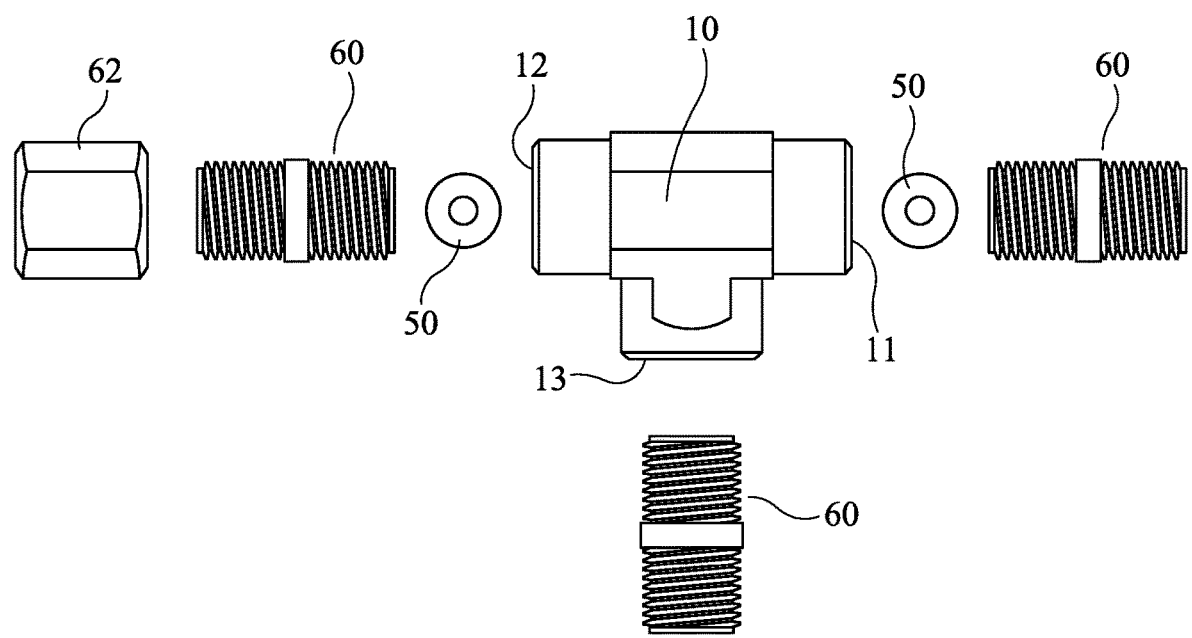
FIG. 1 is a line drawing evidencing an exploded view of the tank seal device.

We disclose an oil tank sealing device also optionally comprising a cable greasing device for the application of friction-reducing grease to cables or ropes that are pulled through industrial machinery, such as those cables used in petroleum storage tanks. The size of such tanks requires the intra-tank employment of cables to place, move and remove sensors, floats and other monitoring devices, and the flammable nature of the tank contents require guards against high friction and associated high heat contacting the tank contents as such cables move through the entry and exit points of the tank.

The sealing device is embodied as a t-shaped pipe comprising multiple components and allowing a cable, hose or similar extending item to move through the device and into the tank. In a preferred embodiment, the tank sealing device comprises a metal or plastic pipe tee with top and bottom holes and a side hole, such tee to be filled with two-part epoxy that is allowed to harden. All metal components of the disclosed device are resistant to oxidation as well as low in electrical conductivity, to offset any potential electric charge from friction between the cap and the cable. Brass, titanium or a suitable alloy would thus be preferred materials. Typically, two of the three holes would be temporarily capped to allow for the epoxy to be introduced into the tee, then removed after hardening to allow for o-rings to be later located directly against a flat epoxy surface within each tee hole.

Perpendicular channels would then then be drilled through the dried epoxy, the first channel between the top and bottom holes of the tee and the second channel between the side hole and the center of the first channel. Preferably, the first channel is for running a cable and would be between 1/8 inch and 5/32 inch in diameter, with 5/32 inches especially preferred. The second channel will be for grease introduction and can be of a similar or smaller diameter. The use of channels within epoxy will prevent the intrusion of air pockets into the device, thus reducing the rate of corrosion of the device and ensuring an even coating of lubricant on the cable, and also creating a barrier to the emission of any liquid or gas from the oil tank.

O-rings would next be placed over the epoxy surface in two of the three tee holes, with a preferred o-ring specification of approximately 1/4" outside diameter and 1/8" inside diameter. A pipe nipple would then be screwed into each of the top and bottom holes, allowing a 1/8" cable to run through both pipe nipples, both o-rings and the tee. One nipple would then also be screwed into a corresponding hole valve in the top of an oil tank, preferably using optional caulk or other sealant, thereby allowing the cable to enter the tank while also sealing the hole in the tank from emissions via the epoxy and grease-filled cable (first) channel. Pipe nipples generally are to be used as adjustable tensioners for the corresponding o-rings. O-ring or gasket materials may include natural rubber, synthetic rubber or any commercially known plastic with the proper characteristics of flexibility and durability, including but not limited to thermoplastic or ultra-high-molecular-weight polyethylene, polypropylene, high impact polystyrene, acrylonitrile butadiene styrene, polyester, polyamides and polyvinyl chloride.

An optional separate greaser component of the tank sealing device can be attached to the pipe tee side hole for the gradual introduction of grease into the two channels, thus coating the cable and enhancing the o ring barrier against tank emissions.

The outer layer of such greaser component is a hardened cylinder, preferably made of metal or hard plastic with a hollow interior forming a refillable grease reservoir. A spring-loaded plunger mechanism will be centered inside the reservoir for forcing grease towards the pipe tee and into the second channel, which plunger will naturally move towards the pipe tee as grease is gradually used, decreasing the amount of grease in the reservoir. An ideal level of pressure for the spring-loading mechanism to provide a constant introduction of grease into the channels is 12-15 pounds per square inch. The greaser component will also have funnel base, also either metal or hard plastic, which will be either integrated with or attached to the proximal end of the cylinder. The funnel base will have a channel running centrally through the funnel base from the reservoir to a connector, which connector shall comprise a piping component capable of screwing together with each of the funnel base and the pipe tee side hole.

The means of refilling the grease reservoir would preferably be a pluggable hole near the end of the greaser component proximal to the pipe tee. Such refilling will either be made with a pressurized delivery device that will press the plunger back into a spring-loaded "full" setting, or the plunger will comprise a manual resetting device allowing grease to be simply poured into the reservoir. Such resetting device can be embodied as a pullable handle, with or without a latch to hold the plunger up during refilling.

All specifications of the disclosed device are scalable according to the size of the cable to which grease must be applied. For example, while standard cables used with oil tanks may be only 1/16" to 1/4" in diameter, a larger version of the same device could also be mounted on a ship for greasing hawsers that are many times the gauge of an oil tank cable.

At least one fill hole, optionally with a stopper, should be placed in a side of the grease reservoir, allowing additional lubricant to be periodically added to the device. In one embodiment, two such holes may be located to allow for the first hole to be used to inject grease while the second hole vents air. At the end of the grease reservoir opposite the cylinder, an external handle may optionally be located and connected to the plunger, allowing the plunger to be drawn back to allow space for the easy introduction of new lubricant as needed.

In another embodiment, a grease line may be arranged between the side hole of the pipe tee and the greaser component, allowing such greaser component to be located at a distance from the sealing device. Such an arrangement may be preferable when the sealing device is placed at a difficult to reach location, by allowing the greaser component to remain on the ground or in a similar location making it easy to manually refill. The greaser line would preferably be of flexible plastic material but could also be embodied as a metallic pipe.

The tank sealing device itself may be seated on the top of a tank, side of a tank, or at any point on or near a tank allowing the cable to be introduced into the tank with adequate space for its necessary movement. Depending upon such location, a means of seating the device may involve bolts, screws or any similar means of fastening that is adequately robust to accommodate the force of movement of the cable without dislocation and allowing necessary access to various parts for refilling and maintenance.

DETAILED DESCRIPTION OF THE FIGURES

FIG. 1 is an exploded view showing the various outer components of the sealing device 1 only. The outer components are largely comprised of off-the-shelf pipe components, including pipe tee 10 comprising a top hole 11, bottom hole 12 and side hole 13, as well as o-rings 50, pipe nipples 60, pipe plugs 61 and dust cap 62.

In a particular point of novelty, two of the three holes 11, 12, 13 of the pipe tee 10 are capped, and the tee is then filled with liquid two-part epoxy 20 (not pictured), which is then allowed to harden. Once the epoxy filler is solid, a first channel 30 is drilled directly from and through top hole 11 and bottom hole 12. A second channel 31 is then drilled from and through the side hole to meet the center of the first channel. At this point, the side hole may either be capped or used for attaching greaser component 80 (not pictured). Once channels are drilled, rubber or plastic o-rings 50 are placed over the epoxy face within each hole, and a pipe nipple 60 is screwed into each such hole until contact between the nipple and o-ring is initiated. In one embodiment, the nipple inserted into the side hole is then closed with a dust cap 62. As each pipe nipple 60 is screwed tighter into the corresponding hole, the related o-ring 50 will spread wider, thus allowing the joint to withstand greater pressure. As such, the sealing device itself becomes adjustable depending on the pressure specifications in a given situation.

Figure 2:
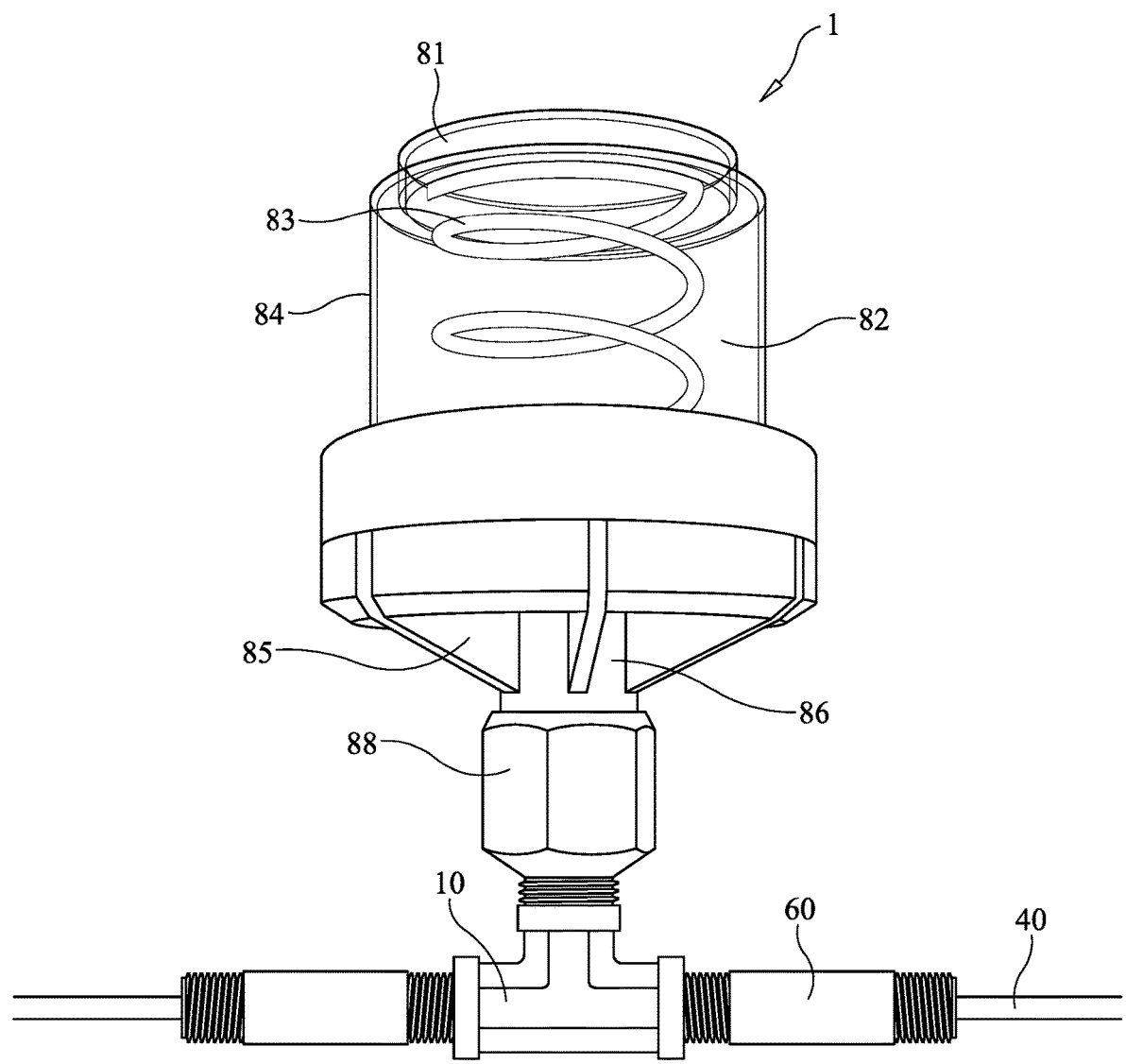
FIG. 2 is a line drawing evidencing a fully assembled tank seal device with a cable greaser component attached.

FIG. 2 evidences a fully-assembled preferred embodiment, in which cable greaser component 80 has been attached to the side hole 13 of pipe tee 10. The outer layer of such greaser component is a hardened cylinder 81 with a proximal end nearer the pipe tee and distal end further from the pipe tee, such cylinder's hollow interior forming a grease reservoir 82 and containing a spring-loaded plunger mechanism for forcing grease 87 towards the pipe tee and into the second channel 31. Such plunger mechanism comprises spring 83, which is anchored against the distal end interior of the cylinder 81, and plunger head 84 which will naturally move towards the pipe tee 10 as grease 87 is gradually forced into the channels 31, 30 and used, decreasing the amount of grease in the reservoir 82. The greaser component 80 further comprises a funnel base 85 either integrated with or attached to the proximal end of the cylinder, such funnel base comprising a funnel base channel 86 running centrally through the funnel base from the reservoir to a connector 88, which connector shall comprises a piping component capable of screwing together with each of the funnel base 85 and the side hole 13. It is understood that each screw connection point of the device will preferably contain an o-ring (not pictured).

Also pictured in FIG. 2 is an optional plunger handle 89, which can be used manually to pull the plunger back towards the distal end of the cylinder, thus allowing for space to refille the reservoir 82 with grease 87 and also re-loading spring 83 to allow for greasing to continue after the refill. In the event that a handle or similar mechanism is not used to pull the plunger, then refilling must be accomplished with a pressurized device. Refilling itself is to be accomplished by introducing new grease into the reservoir through a refill hole 90.

Also pictured in FIG. 2 is cable 40, shown emanating from side hole 11 and running through first channel 30 (not pictured). In this embodiment, the plunger head will push grease 87 from the reservoir into the funnel base channel 86 and thereby into the channels 31, 32 of the epoxy 20 within the pipe tee, wherein the grease will constantly coat cable 40 to minimize friction on all other components, thereby allowing the cable to move through the device, and through any hole to which the device is attached, with minimal wear.

Figure 3:
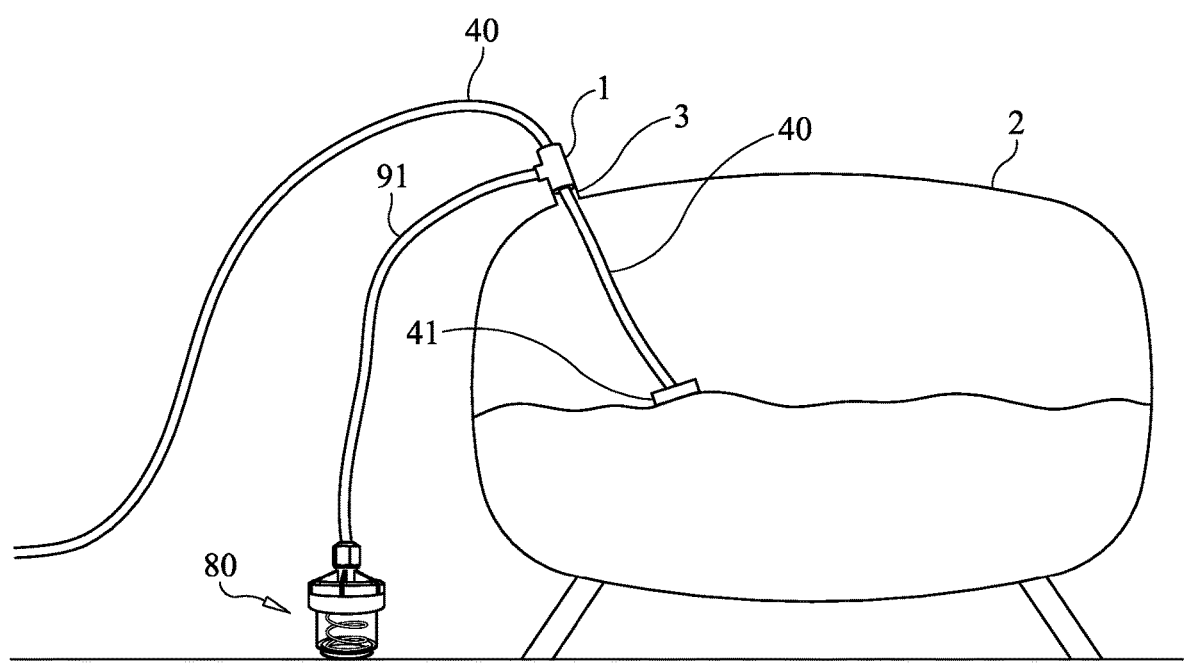
FIG. 3 indicates the full tank sealing device located on the surface of an oil tank.

FIG. 3 indicates the full tank sealing device, located on the surface of an oil tank 2 and attached to oil tank hole 3, with cable 40 showing, with the grease line 91 connecting the sealing device to the greaser component 80, which is located at a lower position for ease of refilling

LIST OF REFERENCE NUMBERS 1 tank sealing device
2 oil tank
3 oil tank hole
10 pipe tee
11 top hole
12 bottom hole
13 side hole
20 epoxy fill
30 first channel
31 second channel
40 cable
50 o-ring
60 pipe nipple
61 pipe plug
62 dust cap 80 greaser component
81 cylinder
82 grease reservoir
86 spring
84 plunger head
85 funnel base
86 funnel base channel
87 grease (not pictured)
88 connector
89 plunger handle (optional—not pictured)
90 fill hole with plug (not pictured)
91 grease line The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An adjustable oil tank seal device, comprising a pipe tee comprising three threaded holes including a top hole, a bottom hole and side hole, said pipe tee filled with solid epoxy comprising a first channel drilled between the centers of the top and bottom holes and a second channel drilled from the center of the side hole to the first channel, further comprising a cable running through the first channel, an o-ring overlaying the epoxy at each of the three holes, pipe nipples screwed into each side hole, and a refillable greaser component screwed into the side hole, such greaser component comprising a cylinder with a hollow grease reservoir, a spring-loaded plunger seated inside the reservoir, a funnel base located between the reservoir and the tee and a connector between the funnel base and the tee, wherein one pipe nipple is attached to a corresponding oil tank hole.

2. The oil tank seal device of claim 1, wherein the pipe tee, pipe nipples, connector and funnel base are all attached via screw threads.

3. The oil tank seal device of claim 1, wherein all hardened components are made of stainless steel, brass, titanium, another metal of low conductivity or a nonconductive plastic.

4. The oil tank seal device of claim 1, wherein the cylinder is comprised of either metal, hard plastic or a combination thereof.

5. The oil tank seal device of claim 1, wherein the cylinder screws onto the funnel base.

6. The oil tank seal device of claim 1, further comprising a plunger handle to manually pull the plunger towards the spring during reservoir refill.

7. The oil tank seal device of claim 1, further comprising a fill hole with a plug in the area of the cylinder near to the funnel base for refilling.

8. The oil tank seal device of claim 1, further comprising wherein the o-ring is located within each joint of the device.

9. The oil tank seal device of claim 1, wherein each o-ring is made from one or more of the group consisting of rubber, synthetic rubber or neoprene.

10. The oil tank seal device of claim 1, wherein a hardened plastic block is manufactured by filling the pipe tee with a two-part nonconductive epoxy composition.

11. The oil tank seal device of claim 1, further comprising a grease line connecting the side hole of the pipe tee to the greaser component connector.

12. A method of manufacturing the adjustable oil tank seal device of claim 1, comprising the following steps:
   1. Screw a pipe plug into each of two holes of the pipe tee,
   2. Fill the pipe tee with two-part epoxy through an open hole and allow to dry;
   3. Remove the pipe plugs;
   4. Drill the first channel between the top and bottom holes and the second channel from the side hole;
   5. Place o-rings over each end of the first channel and secure by attaching a pipe nipple to each of the top hole and bottom hole;
   6. Attach an assembled greaser component to the side hole; and
   7. Extend a cable through the first channel and pipe nipples.

13. A method of use of the adjustable oil tank seal device of claim 1, comprising the following steps:
   1. Attach the pipe nipple covering the bottom hole of the pipe tee to a corresponding oil tank hole by screwing, clamping or a similar means of attachment;
   2. Extending a cable into the top hole through the first channel and out through the bottom hole and accompanying pipe nipple;
   3. Attaching the protruding end of the cable to an attachment for use inside the oil tank;
   4. Extending the attachment and cable through the oil tank hole and into the oil tank; and
   5. Filling the greaser component with grease.

* * * * *